June 8, 1965 L. G. COLE 3,188,283
ELECTROLYTIC PROCESS FOR REMOVING MOISTURE
Filed Jan. 3, 1961 3 Sheets-Sheet 1
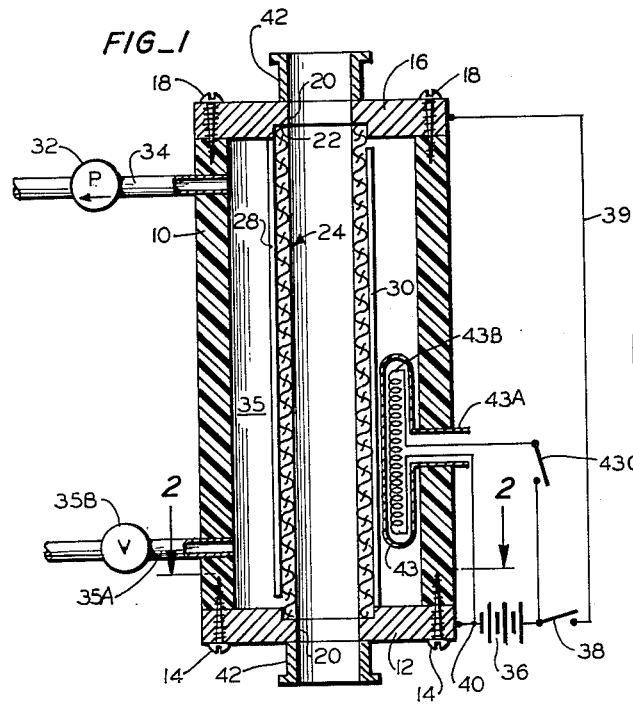
FIG_1
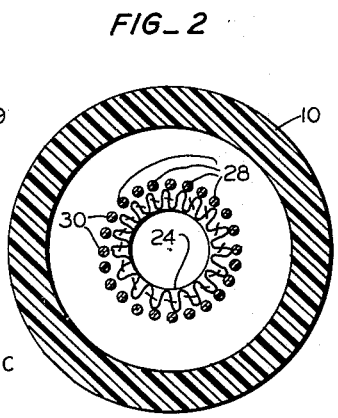
FIG_2
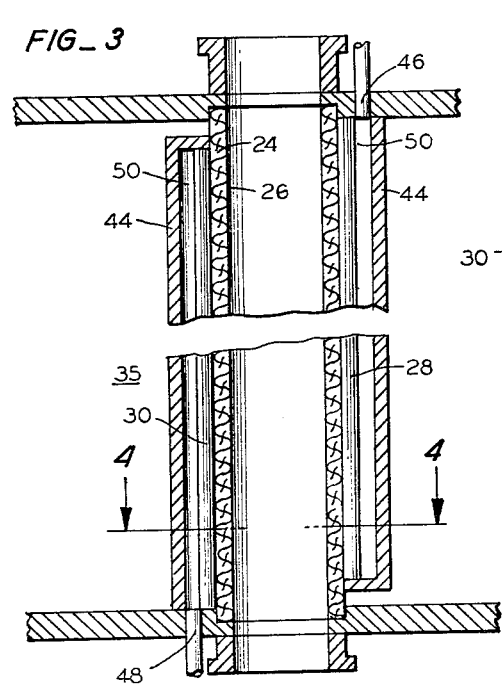
FIG_3
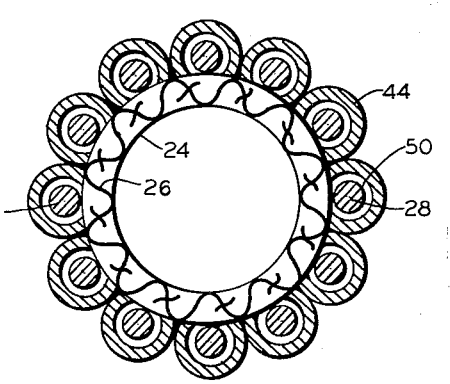
FIG_4
INVENTOR.
LELAND G. COLE
BY Christie, Parker & Hale
ATTORNEYS

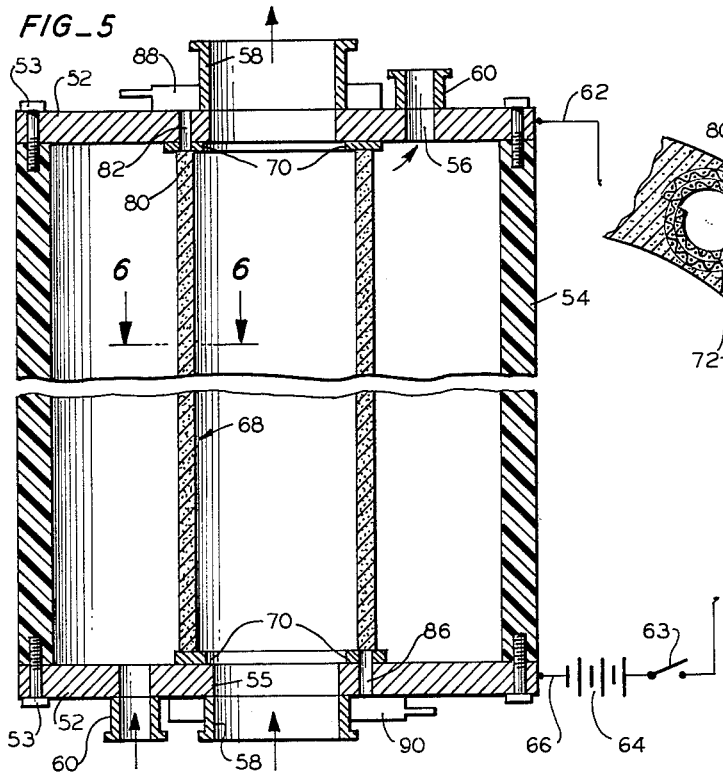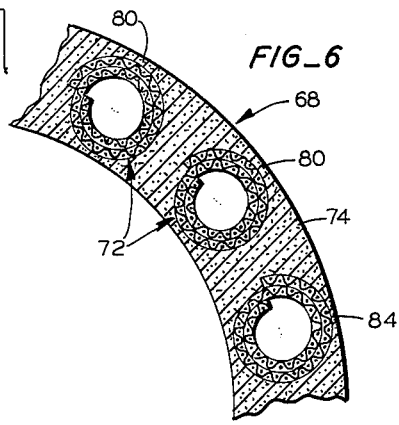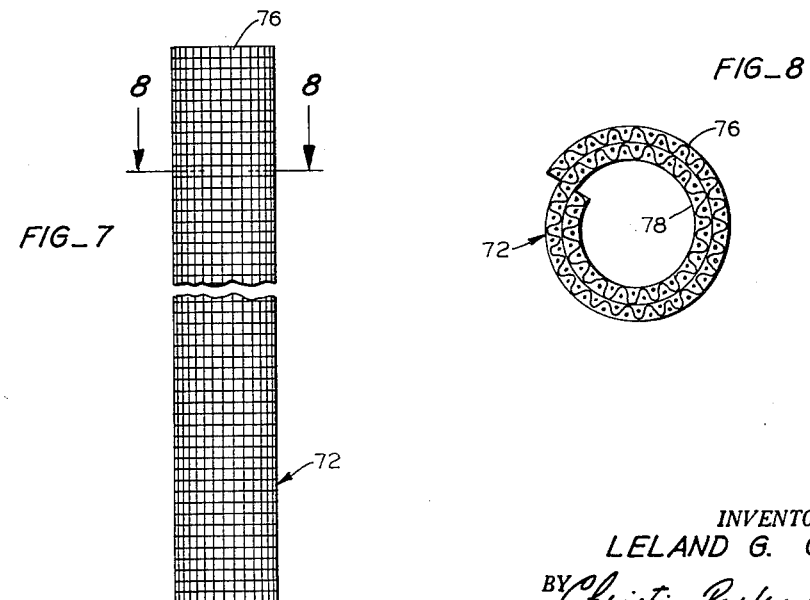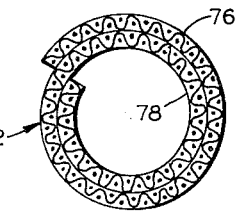

June 8, 1965 L. G. COLE 3,188,283
ELECTROLYTIC PROCESS FOR REMOVING MOISTURE
Filed Jan. 3, 1961 3 Sheets-Sheet 3
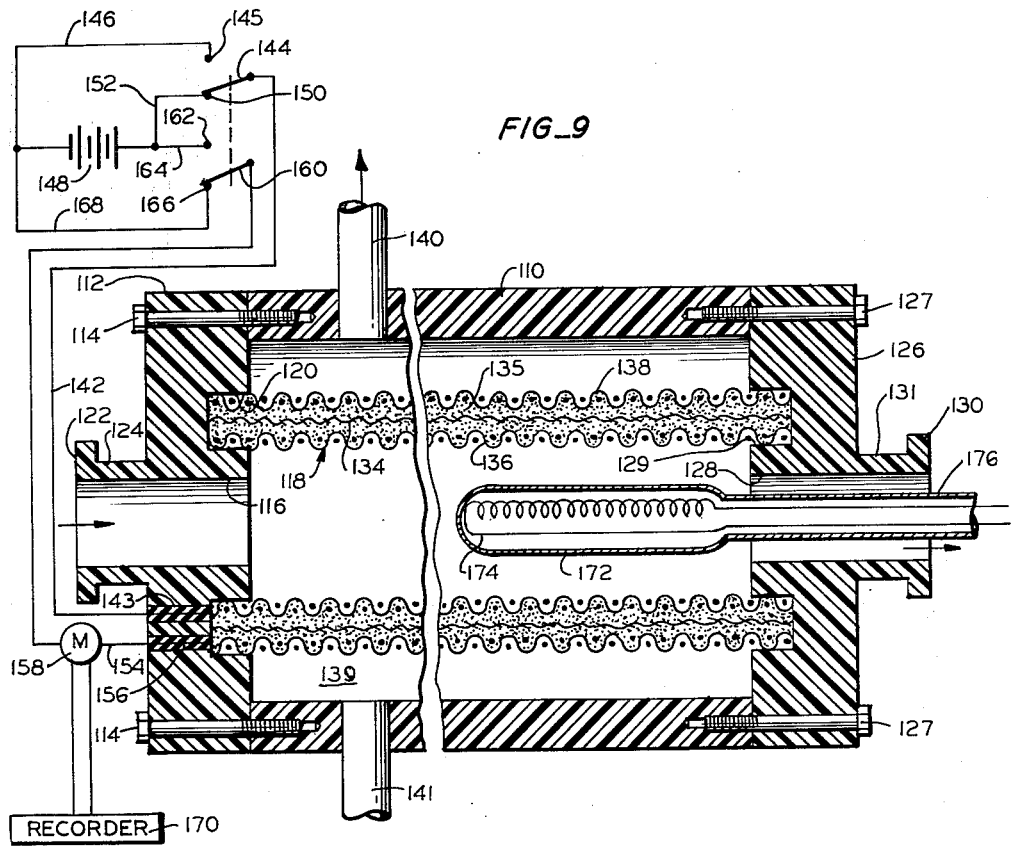
FIG_9
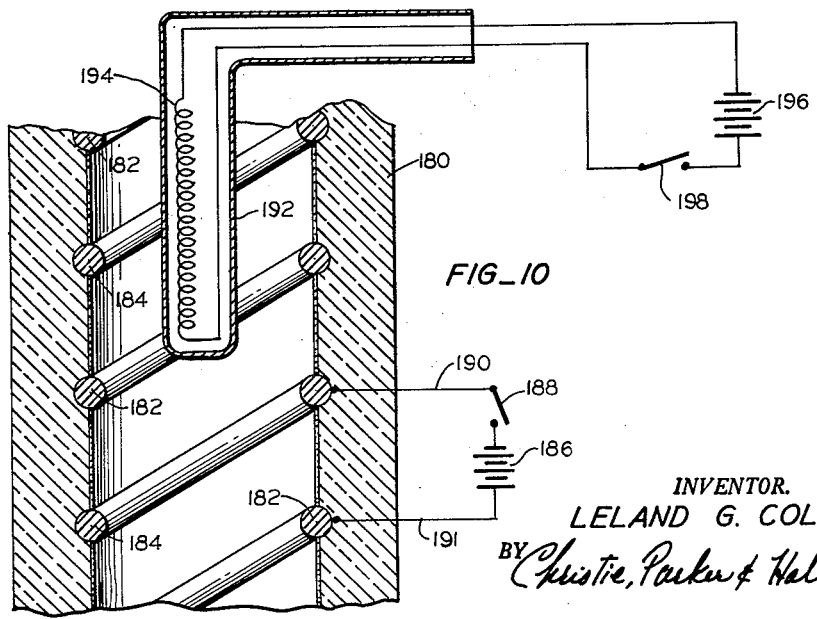
FIG_10
INVENTOR.
LELAND G. COLE
BY Christie, Parker & Hale
ATTORNEYS

3,188,283
ELECTROLYTIC PROCESS FOR REMOVING MOISTURE
Leland G. Cole, Fullerton, Calif., assignor to Consolidated Electrodynamics Corporation, Pasadena, Calif., a corporation of California
Filed Jan. 3, 1961, Ser. No. 80,188
6 Claims. (Cl. 204—129)

This invention is a continuation-in-part of my copending applications Serial No. 676,117, filed August 5, 1957, now abandoned, and Serial No. 812,498, filed May 11, 1959, now U.S. Patent No. 3,038,853, issued June 12, 1962, and relates to methods and apparatus for continuous removal of a material from a substance by sorbing the material in a sorption medium and subjecting the sorbed material to electrolysis to effect the separation of at least one of the electrolytic decomposition products from the substance.

Although not so limited, this invention is described with particular reference to the removal of a material, such as water, from a fluid stream, such as air.

Numerous processes have been used in the past for the continuous removal of materials from fluid streams by absorptive and adsorptive processes. Many of these prior processes require the simultaneous operation of dual or multiple absorption or adsorption columns to effect the regeneration of the one or more units while another unit or other units is used for the initial sorption. Other prior procedures have the disadvantage of either contaminating the fluid with electrolysis decomposition products, or else requiring complex mechanical devices, such as moving belts and locks or dynamic seals, for continuous transport of the sorption medium from contact with the fluid to an external reaction zone where the sorption material is regenerated, and for the subsequent return of the regenerated sorption medium by mechanical means.

This invention provides for the removal of a material from a fluid by sorption in a suitable sorption medium and subsequent electrolytic decomposition of the material in such a manner that at least one of the decomposition products is removed from the fluid, even while the fluid is in contact with the sorption medium. Thus, the decomposition products need not contaminate the fluid, transport of the sorption medium from the fluid is not required, and the sorption medium is continuously regenerated.

Briefly, in terms of method, the invention contemplates removing from a fluid a material susceptible to electrolytic decomposition by contacting a sorption matrix or membrane with the fluid. The membrane has the characteristic of sorbing the material from the fluid, and the sorbed material is subjected to electrolytic decomposition in the membrane. At least one of the decomposition products is separated from the fluid stream while the stream is in contact with the sorption medium.

In the presently preferred method, the sorption medium is used as a wall which is contacted on one side by a fluid stream and on the other side by at least one of a pair of electrodes used to electrolytically decompose the sorbed material in the sorption medium. In one instance, the electrodes are in contact with opposite sides of the wall of the sorption medium so that one of the decomposition products is released to mix with the fluid stream and the other diffuses through the wall to be released free from the fluid stream.

In another case, both electrodes are in contact with the side of the sorption medium wall opposite from that of the fluid stream, so that both decomposition products are released free of the fluid stream, and are collected together or separately, as desired.

In one method of the invention, one or both of the electrodes are in contact with the same side of the wall of the sorption medium as the fluid stream, and at least one of the decomposition products released to mix with the fluid stream is separated by diffusing it through a separation diaphragm selectively permeable to the product to be separated. For example, if the decomposed sorbed material is water, and the hydrogen is released to mix with the fluid stream, the hydrogen is removed by diffusing it through a heated palladium diaphragm disposed in the fluid stream.

In terms of apparatus for removing from a fluid a material susceptible to electrolytic decomposition, the invention contemplates a conduit which is adapted to hold the fluid. The conduit includes a sorption medium, which has the characteristic of sorbing the material from the fluid. Means are provided for electrolyzing the sorbed material so that electrolytic decomposition products are formed and released from it. Means are provided for selectively diffusing at least one of the components of the sorbed material out of contact with the fluid stream.

In one form of the invention, the sorption medium is constructed as a wall, or part of a wall, and a pair of electrodes are in contact with opposite sides of the wall. In this case, the decomposition product from one of the electrodes is released to mix with the fluid stream on the same side of the wall as that electrode.

In another form, both electrodes are in contact with the wall of sorption material on the side opposite from the fluid stream so both decomposition products are released free of the fluid stream.

In the preferred form of the invention, the electrolyzing means is a plurality of cathodes and anodes arranged to minimize interelectrode spacing and provide a path of low resistance for the discharge of electrolytic decomposition products from the outer surface of the membrane.

The terms "sorb" and "sorption" are used in the usual sense of pertaining to the phenomena of absorption or adsorption of materials by a suitable medium.

The invention will be more fully understood from the following detailed description taken in conjunction with the accompanying drawings in which:

FIG. 1 is a partially schematic sectional elevation of apparatus for carrying out the invention;

FIG. 2 is a view taken on line 2—2 of FIG. 1;

FIG. 3 is a fragmentary sectional elevation of the invention which permits independent recovery of the electrolytic decomposition products;

FIG. 4 is a view taken on line 4—4 of FIG. 3;

FIG. 5 is a schematic sectional elevation of an alternate embodiment of the invention;

FIG. 6 is a view taken on line 6—6 of FIG. 5;

FIG. 7 is an elevation of an electrode used in the apparatus shown in FIG. 5;

FIG. 8 is a view taken on line 8—8 of FIG. 7;

FIG. 9 is a schematic sectional view of the alternate embodiment of this invention; and FIG. 10 is a fragmentary sectional view of another embodiment of this invention.

Referring to FIGS. 1 and 2, the electrolytic apparatus of this invention includes an upright tubular outer housing 10 of a suitable insulating material such as plastic. An annular inlet end plate 12 is secured by screws 14 to the lower end of the housing, and an annular outlet end plate 16 is secured by screws 18 to the upper end of the housing. Each end plate has a central bore 20 for the inlet and outlet of a fluid (not shown), and is of a conductive material, such as stainless steel. An annular shoulder 22 is formed around each bore 20 on the inner face of each end plate and receives a respective end of a tubular sorption matrix or membrane wall 24, which is as thin as possible consistent with the mechanical strength of the sorption material, and which preferably is built up on a reinforcing material such as a fiber glass fabric 26, as described below. A plurality of elongated and spaced anodes 28 are welded to the interior of the outlet plate around bore 20 and extend along almost the entire length of the outer surface of the sorption membrane to be in good electrical contact with it. A plurality of elongated and spaced cathodes 30 are welded at their lower ends to the inner face of the inlet plate around bore 20 and are disposed between and spaced from adjacent anodes to extend along almost the entire length of the outer surface of the sorption membrane and be in good electrical contact with it.

A pump 32 is connected by a discharge line 34 to the upper portion of the annular space 35 formed between the housing and sorption membrane to remove decomposition products as they are formed. If desired, a sweeping gas such as air or nitrogen is admitted to the other end of the annular space through a line 35A and a valve 35B. The use of the pump is optional and it may be omitted, since diffusion and normal gas expansion accompanying evolution of the electrolytic decomposition products at the electrodes will force the products to flow out of the annular space. Thus, the electrolysis of the sorbed material and removal of the decomposition products maintains a concentration gradient across the sorption matrix to cause the material to diffuse from the fluid side of the matrix toward the electrodes.

The positive end of a D.C. power source 36 is connected through a switch 38 and lead 39 to the outlet end plate. The negative end of the power source is connected by a lead 40 to the inlet end plate. The outlet and inlet end plates are adapted to be connected by flanges 42 to a fluid supply (not shown) and fluid receiver (not shown).

A separation diaphragm 43 in the form of a closed envelope is disposed in the annular space 35, and is connected to the exterior of the apparatus by a conduit 43A, which extends through the housing 10. A heating coil 43B is disposed in the envelope and is adapted to be connected through a switch 43C to the battery 36. The material of which the separation diaphragm is made depends upon the decomposition products which collect in the annular space. The diaphragm material should be preferentially permeable to the decomposition product to be removed selectively from the annular space. If hydrogen is to be separated, the diaphragm is made of palladium.

Numerous sorption materials are available for use in accordance with this invention, depending on the nature of the fluid and the material to be removed. The electrolytic properties of the sorption material should be unaffected by all substances in the fluid, and preferably, the sorption material is capable of removing the desired material quantitatively from the fluid. Also in the preferred form, the sorption material is non-conducting when all or substantially all of the sorbed material has been decomposed electrolytically.

To consider a specific example, the anhydride of phosphoric acid (phosphorous pentoxide) is a satisfactory sorption medium for removing water from fluid streams such as air, buffering atmospheres, furnace atmospheres, petroleum and chemical plant streams, chlorine, sulfur dioxide, ethylene, ethyl chloride, or other halogen-substituted hydrocarbons such as the "Freons."

One convenient way for preparing the sorption membrane when phosphoric acid ($H_3PO_4$) is used, is to dip a tubular screen of porous glass fiber cloth in phosphoric acid. The screen is then removed from the acid and dried to form an anhydrous phosphoric acid (phosphoric pentoxide) coating on the screen. If a gas-impermeable membrane is not formed with the first dipping and drying operation, the cycle is repeated as many times as necessary to build up a phosphorous pentoxide-phosphoric acid membrane capable of retaining the fluid which is placed in contact with it. The membrane is then inserted in the position shown in FIG. 1, the electrodes providing additional support for the membrane, and the apparatus is completely assembled as shown.

Preferably, the apparatus is first operated without putting a fluid stream through it for a sufficient time to dry the membrane thoroughly and thus bring it to a hygroscopic level capable of absorbing water from the fluid stream to be dried. This condition is indicated by failure of the membrane to conduct appreciable electrical current, and the membrane now has strong hygroscopic properties. For example, at 25° C. the equilibrium value of water vapor in contact with anhydrous phosphoric acid is less than $2 \times 10^{-5}$ mm. Hg.

Other examples of suitable hygroscopic materials which can be used according to this invention for water removal are sodium oxide (dried NaOH), or potassium oxide (dried KOH), which conveniently may be used where acid conditions are objectionable but basic conditions can be tolerated. Still other examples are $K_3PO_4$, $CaCl_2$, $CuSO_4$, $Na_2SO_4$, and $Ba(OH)_2$. In fact, the sorption medium need not be an electrolyte, but can be an inert material, such as silica gel, or porous glass (sold under the trademark "Thirsty Glass," which becomes conductive when moisture is adsorbed on its surface).

In operating the apparatus to remove water from a fluid, a stream of the fluid is passed through the interior of the sorption membrane and the switch 38 is closed to apply a D.C. potential across the cathodes and anodes. Water is absorbed from the fluid stream by the hygroscopic material and migrates to the outer surface of the sorption membrane, the thickness of the membrane being sufficiently small to provide for low transit times for the migrating water. The water in the hygroscopic material undergoes electrolytic decomposition at the electrodes, and oxygen and hydrogen gas are evolved in the annular space between the housing and the exterior of the sorption membrane. Preferably, pump 32 is operated to maintain a lower pressure in the annular space than exists in the fluid so that the gases are urged outwardly and are readily pumped away from the outer surface of the membrane and from the electrodes, or else a sweep gas such as air is pumped through the annular space to keep the hydrogen and oxygen concentration at a low level to provide a maximum concentration gradient for their diffusion to the outer surface of the membrane.

Thus, the sorption material is continuously regenerated in place, and the decomposition products are prevented from contaminating the fluid stream. This is an important advantage in water removal from fluids used in systems which cannot tolerate either a strong reducing agent or a strong oxidizing agent, such as the hydrogen and oxygen produced by the electrolytic decomposition of water. Moreover, under some conditions, the production of hydrogen can approach dangerously the lower explosive limit, which produces a hazard for both personnel and equipment.

The invention can also be practiced by modifying the apparatus of FIGS. 1 and 2 to use lines 34 and 35–A as a fluid outlet and inlet, respectively, in the annular space 35, and the electrodes can be disposed inside the sorption membrane instead of outside it. In this modified arrangement the fluid is disposed in the annular space and the decomposition products are removed from the interior of the membrane. However, with either arrangement and for the purpose of defining this invention, the term "inner" when applied to a surface means a surface in contact with the fluid, and the term "outer" when applied to a surface means a surface in contact with the electrolytic decomposition products.

In another mode of operation, the heater in the palladium envelope is turned on with the valve 35B closed and the pump 32 turned off so that the hydrogen accumulated in the annular space 35 is selectively diffused through the envelope wall. After the run is complete, the pump 32 is turned to remove the oxygen, or the valve 35B is opened to permit the oxygen to vent.

From the foregoing discussion, it will be appreciated that the principle of this invention can be extended to the elimination of other substances whose decomposition can be effected electrolytically. For example, the detection or elimination of hydrogen fluoride from gas streams without the subsequent contamination of the downstream fluid by either hydrogen or fluorine is effected in the same manner as described above, except that the sorption medium is a compound such as potassium acid fluoride, lithium fluoride, or other suitable compounds which sorb hydrogen fluoride and become electrically conductive.

An alternate embodiment of the invention permits the recovery of the electrolytic decomposition products independently of one another to produce high purity and valuable by-products. For example, in the removal of water from a fluid stream, high purity oxygen and hydrogen can be produced and recovered independently, and high purity hydrogen and fluorine can be recovered in the case of electrolytically decomposed sorbed hydrogen fluoride. Apparatus for independent recovery of electrolytic decomposition products is shown in FIGS. 3 and 4. This apparatus is identical with that of FIGS. 1 and 2 except that a separate hood or envelope 44 is disposed around and spaced from each of the electrodes. As shown in FIG. 4, each hood is semi-circular in cross section and has its longitudinal edges bonded to the sorption matrix on each side of respective electrodes. Each hood disposed around the anodes is sealed at its upper end to the upper plate around a separate respective anode decomposition product outlet 46 extending through the upper plate, and each hood disposed around the cathodes is similarly sealed against the sorption matrix and a separate cathode decomposition product opening 48 which extends through the lower plate.

As shown in FIG. 3, the end of each hood remote from the plate to which it is attached is sealed to the matrix adjacent the free end of its respective electrode, so that a separate decomposition product collection chamber 50 is formed around each electrode and is connected to a respective decomposition product outlet. Preferably, the hoods are made of a suitable insulating material.

The operation of the apparatus of FIGS. 3 and 4 is similar to that shown in FIGS. 1 and 2. The fluid flows through the center part of the sorption matrix which sorbs the material to be removed. Voltage is applied across the anodes and cathodes so that electrolytic decomposition takes place at the outer surface of the sorption matrix. Anions are attracted to the anodes and the atoms formed at the anodes are trapped in the space between the anodes and the respective hoods, and recovered through the by-product recovery openings 46 in the upper plate. Cations are attracted to the cathodes where they are neutralized and recovered in a similar manner through the by-product recovery openings 48 in the lower plate. If desired, hoods are provided around only one set of electrodes, say the anodes, and the cathodes are left uncovered. This construction is simpler and permits the by-products attracted to the cathodes to be collected in the annular space 35 between the sorption matrix and the housing.

Thus, the apparatus of FIGS. 3 and 4, not only is a material removed from a fluid by simultaneous sorption and electrolytic decomposition, but high purity by-products are also recovered. This apparatus has the additional advantage that recombination of the decomposition products is avoided and thereby reduces explosion hazards.

The apparatus shown in FIGS. 5 through 8 is another embodiment of the invention which permits recovery of the decomposition products independently of one another to produce high purity by-products.

Referring to FIG. 5, a pair of metal end plates 52 are secured by screws 53 over the opposite ends of a tubular outer housing 54 made of a suitable insulating material such as plastic. Each end plate includes a central opening 54 and a side opening 56 extending through it. A separate flange connection 58 around each central opening is adapted to be connected to a system (not shown) to let fluid either in or out of the housing interior as required. Similar flange connections 60 are disposed around the side outlets in the plates. The upper (as viewed in FIG. 5) plate is connected through a lead 62 and a switch 63 to the positive side of a D.C. source 64, and is hereinafter referred to as the anode end plate. The other end plate is connected through a lead 66 to the negative terminal of the D.C. source, and is hereinafter referred to as the cathode plate. A tubular sorption matrix 68 is coaxially disposed in the housing and sealed at each end against the end plates by an annular gasket 70 around the central openings in the end plates.

As shown most clearly in FIG. 6, the sorption matrix includes a plurality of elongated tubes 72 spaced from each other and bridged and held together by a suitable sorption medium 74 such as phosphoric acid anhydride. The detailed construction of the electrodes is shown in FIGS. 7 and 8. Each electrode is formed from a roll of screen 76 so that each electrode not only has a longitudinal passageway 78, but also has lateral permeability due to the porosity of the screen. The hollow and porous electrodes can be formed in a variety of ways and from many different materials. A suitable electrode is made by rolling a section of screen of about 300 mesh to form a tube having an outside diameter of $3/16''$ and an inside diameter of $1/32''$. After rolling, the screen is heated to cause the screen to fuse, but not close the screen openings.

The sorption matrix may be prepared in many different ways, and one way is to support the plurality of electrodes in a suitable holder in the configuration shown in FIG. 5, and then coat the exterior of the electrodes with phosphoric acid, applying a suitable number of layers with drying between each application to build up a sorption medium as shown in FIG. 6. Thus, a tubular sorption matrix is formed which is coated on both its interior and exterior with the sorption medium.

Alternate electrodes 80 project from one end of the sorption matrix into respective bores 82 formed through the anode end plate around the central opening of the plate. The projecting portions of electrodes 80 are uncoated and are in good electrical contact with the anode plate, thus serving as anodes. The other ends of the anodes butt against the gasket on the cathode end plate so the anodes are sealed at their ends adjacent that plate. The sorption matrix can also be built up on the electrodes by vapor deposition, spraying, etc.

The electrodes 84 disposed between adjacent anodes project from the opposite end of the sorption matrix into respective bores 86 formed through the cathode plate around the central opening of the plate. The projecting portions of electrodes 84 are uncoated and are in good electrical contact with the cathode plate, thus serving as cathodes. The other ends of the cathodes butt against the sealing gasket at the anode plate so those ends of the cathodes are hermetically sealed. An annular anode collection manifold 88 is sealed over the anode openings in the anode plate, and an annular cathode collection manifold 90 is sealed over the cathode openings in the cathode plate, so that the electrolytic decomposition products can be collected separately and independently of each other in the manifolds.

The operation of the apparatus of FIGS. 5 through 8 is as follows:

The fluid flows through the center of the sorption matrix by passing in and out of the central opening of the end plate, and fluid also flows through the annular space between the sorption matrix and the housing by flowing in and out the side openings in the end plates. In fact, two different types of fluid can be circulated simultaneously through the apparatus of FIG. 5 and material be sorbed and decomposed simultaneously from each fluid by the single sorption matrix. As shown by arrows of FIG. 5, fluid flows in the central opening of the anode plate and out the central opening of the cathode plate, and fluid flows in the side opening of the cathode plate and out the side opening of the anode plate. As fluid flows through the apparatus in contact with the sorption matrix, the material to be removed is sorbed and subjected to the electric field established in the sorption matrix between adjacent electrodes. Electrolytic decomposition takes place, and positive ions diffuse to the cathodes while negative ions diffuse to the anodes. The ions are neutralized at their respective electrodes, diffuse into the central passageway of each electrode and then pass to the respective collection manifold where they are collected.

The electrodes can be of any suitable materials which are inert to the sorption medium and the electrolytic decomposition products. For example, in removing water with anhydrous phosphoric acid, the anodes are made of platinum wire about 1 mil in diameter, and the cathodes are 1 mil stainless steel wire. The spacing between, and voltage across, adjacent anodes and cathodes can vary widely, but a spacing of 1 mil and voltage of 30 volts provides satisfactory operation at about 30° C. and near atmospheric pressure.

Referring to FIG. 9, a cylindrical envelope 110 is closed at its left end as viewed in the drawing by a first annular plate 112 secured by screws 114 to the envelope. The first plate includes a central inlet opening 116 through it to admit a fluid (not shown) to the interior of a hollow cylindrical sorption matrix or membrane 118 having its left end disposed in an annular groove 120 in the surface of the first plate around the inlet opening. An outwardly extending flange 122 on the left end of a longitudinally extending pipe section 124 formed integrally with the first plate around the inlet opening is adapted to be connected to a source (not shown) of the fluid containing a material which is to be removed by sorption and electrolytic decomposition.

A second annular plate 126 is secured by screws 127 to the outlet or right end of the envelope 110. The second plate includes an outlet opening 128 in its central portion and an annular groove 129 on its inner surface of the second plate around the outlet opening to receive the right end of the sorption matrix. An outwardly extending flange 130 on the right end of a longitudinally extending pipe section 131 formed integrally with the second plate around the outlet opening is adapted to be connected to a line (not shown) carrying the fluid to a desired point of storage or further treatment.

The sorption matrix can assume any suitable form, but preferably it is made up of a tubular sleeve 134 of a porous and insulating material such as cloth or glass fibre. The insulating sleeve or core is imbedded in a cylindrical and hollow body of suitable sorption material 135. A first electrode 136, in the form of a cylindrical screen is disposed against the inner surface of the sorption material. The innermost portion of the screen is not covered by the sorption material so that bare portions of the first electrode are exposed to the fluid passing through the conduit. A second electrode 138 in the form of a cylindrical screen is concentrically disposed around the first screen and sorption material to be in contact with the outer surface of the sorption material. The outermost part of the second electrode is not covered by sorption material so that bare portions of the second electrode are in direct contact with the annular space lying between the outer surface of the conduit and the inner surface of the envelope 110. A product removal line 140 opens into the annular space for the removal of one of the decomposition products. An alternate fluid inlet line 141 opens into the annular space for a purpose described in detail below.

One end of a first electrical lead 142 is connected to the left end of the inner electrode. The lead 142 passes through a first sealing bushing 143 in the first plate and is adapted to be connected through a first switch 144 to either a first contact 145 which is connected by a lead 146 to the negative terminal of a battery 148, or to a second contact 150 which is connected by a lead 152 to the positive terminal of the battery. One end of a second electrical lead 154 is connected to the left end of the second or outer electrode and extends through a second sealing bushing 156 in the first plate, and is connected to an ammeter 158 which in turn is adapted to be connected through a second switch 160 to either a third contact 162 connected to the positive terminal of the battery by lead 164, or to a fourth contact 166 connected by lead 168 to the negative terminal of the battery. A recorder 170 is connected to the ammeter for recording the amount of decomposition current flowing through the circuit.

An envelope 172 made of palladium is disposed within the cylindrical sorption matrix 118 and encloses a heating coil 174, which is adapted to be connected to a suitable source (not shown). The envelope is also adapted to be connected to the exterior of the apparatus shown in FIG. 9 through a conduit 176 so the envelope can be used to separate hydrogen, if desired, and as previously described with respect to FIG. 1.

As previously indicated, numerous sorption materials are available for use in accordance with this invention, depending on the nature of the fluid and the material to be removed. Electrolytic properties of the sorption material should be unaffected by all substances in the fluid, and preferably the sorption material is capable of removing the desired material quantitatively from the fluid. In a preferred form of the invention, the sorption material is non-conducting when all, or substantially all, of the sorbed material has been decomposed electrolytically.

To consider a specific example, the anhydride of phosphoric acid (phosphorus pentoxide) is a satisfactory sorption medium for removing water from fluid stream such as air, buffering atmospheres, furnace atmospheres, petroleum and chemical plant streams, chlorine, sulphur dioxide, ethylene, ethyl chloride, or other halogen-substituted hydrocarbons such as the "Freons."

One convenient way for preparing the sorption membrane when phosphoric acid ($H_3PO_4$) is used, is to dip the tubular insulating core, which may be made of porous glass fiber cloth, in phosphoric acid. The core is then removed from the acid and dried to form an anhydrous phosphoric acid coating on the screen. If a fluid-impermeable membrane is not formed with the first dipping and drying operation, the cycle is repeated as many times as necessary to build up a phosphorus pentoxide-phosphoric acid membrane capable of retaining the fluid which is placed in contact with it. The electrode screens are then placed in the position shown in the drawing and bonded to the sorption material by painting, spraying, or otherwise coating with additional phosphoric acid solution. The membrane is then inserted in the position shown in the drawing, the electrical leads being previously connected to their respective electrodes and let through their respective bushings.

Preferably, the apparatus is first operated without putting a fluid stream through it for sufficient time to dry the membrane thoroughly and thus bring it to a hygroscopic level capable of absorbing water from the fluid stream to be dried. This condition is indicated by the failure of the membrane to conduct appreciable electrical current, and the membrane now has strong hygroscopic properties. For example, at 25° C. the equilibrium value of water vapor in contact with anhydrous phosphoric acid is less than $2 \times 10^{-5}$ mm. Hg.

Other examples of suitable hygroscopic materials which can be used according to this invention for water removal are sodium oxide (dried NaOH), or potassium oxide (dried KOH), which conveniently may be used where acid conditions are objectionable but basic conditions can be tolerated.

The electrodes can be of any suitable materials which are inert to the sorption medium or material and the electrolytic decomposition products. For example, in removing water with anhydrous phosphoric acid, the anode is platinum screen made of wire about 1 mil in diameter, and the cathode is stainless steel screen made of wire about 1 mil in diameter. The spacing between, and voltage across, the electrodes can vary widely, but a spacing of about 1 mil and a voltage of 40 volts provide satisfactory operation at about 30° C. and near atmospheric pressure. When the apparatus is to be used as shown in the drawing so that either one of the electrodes may serve as either a cathode or anode, preferably both electrodes are platinum screen.

In operating the apparatus to remove water from a fluid, say a stream of humid air, the air is passed through the conduit as indicated by the arrows in FIG. 9, and the switches 144 and 160 are set in the position shown so that the interior electrode is the anode and the exterior electrode is the cathode. Water is absorbed from the air by the hygroscopic material and migrates to the central portion of the sorption material where it is subjected to the electric field established between the anode and the cathode. The thickness of the membrane is sufficiently small to provide for low transit times for the migrating water. Water in the sorption material undergoes ionization. The oxygen ions are attracted to the inner electrode (the anode), and the hydrogen ions are attracted to the outer electrode (cathode). The oxygen ions, on reaching the cathode, give up electrons to become neutral oxygen atoms, which then combine to form oxygen molecules. The oxygen gas is evolved from the interior surface of the conduit or sorption material and re-enters the air stream passing through the apparatus. The hydrogen ions, on reaching the cathode, take up electrons to become neutral hydrogen atoms which then combine to form hydrogen molecules so that hydrogen gas is released from the exterior surface of the conduit or sorption matrix. The hydrogen gas is collected in the annular space between the sorption matrix and the envelope and may be drawn off through the product removal pipe 140 for storage or use.

Thus, the sorption material is continuously regenerated in place, and the cathodic decomposition product (hydrogen) is prevented from contaminating the fluid stream flowing through the apparatus. This is an important advantage in water removal from fluids used in systems which cannot tolerate a strong reducing agent. Moreover, under some conditions the production of hydrogen can dangerously approach the lower explosive limit, which produces a hazard for both personnel and equipment.

If it is desired to remove the anodic decomposition product (oxygen) from the fluid stream instead of the cathodic decomposition product, the switches 144 and 160 are thrown so that they are respectively connected to contacts 145 and 162, reversing the polarity of the electrodes. Operating under this condition, the hydrogen is left in the fluid stream, and the oxygen is removed from it. This is advantageous in systems which cannot tolerate the presence of a strong oxidizing agent such as oxygen in the fluid stream. Alternatively, the heating coil in the palladium envelope is turned on to raise the temperature so that hydrogen diffuses from the fluid stream into the envelope, thus removing both decomposition products from the fluid stream.

The invention can also be practiced by modifying the apparatus of the drawing to use lines 140 and 141 as a fluid outlet and inlet, respectively, in the annular space 139. In this modified arrangement, the fluid is disposed in the annular space and the decomposition product to be removed separately from it is removed from the interior of the membrane. However, with either arrangement and for the purpose of defining this invention, the term "inner" when applied to a surface means a surface in contact with the fluid, and the term "outer" when applied to a surface means a surface in contact with the electrolytic decomposition product being removed from the fluid.

Under some conditions it may be desirable to have two different fluids under treatment simultaneously on opposite sides of the sorption membrane, with one decomposition product from the first fluid being discharged into the second fluid and another decomposition product from the second fluid being discharged into the first. For example, in drying separate streams of hydrogen and oxygen, the switches are set as shown in the drawing to make the outer electrode the cathode and the inner electrode the anode. The oxygen stream is passed through the interior of the sorption matrix, and the hydrogen stream through the annular space surrounding the matrix. Water is sorbed from both streams and decomposed. Hydrogen is discharged into the hydrogen stream, and oxygen is discharged into the oxygen stream.

In the embodiment of FIG. 10, a cylindrical glass housing 180 is adapted to have a fluid stream pass through it. A first electrode 182 is coiled in the form of a helix inside the housing 180 and is in contact with the housing interior. A second electrode 184 is coiled in the form of a helix and disposed so that adjacent turns of the second helix are disposed against the housing interior between adjacent turns of the first helix. The space between the adjacent turns of the electrodes is bridged by a suitable electrolyte coating, such as $P_2O_5$, or else the glass is of the porous type so that it absorbs water on its surface and becomes conductive. Electrolytic decomposition current is supplied to the electrodes from a battery 186 through a switch 188 and leads 190, 191.

A palladium envelope 192 is disposed within the housing and spaced from it. A heating coil 194 is in the envelope and heated by a battery 196 when a switch 198 is closed.

In the operation of the apparatus of FIG. 10, say to remove moisture from an air stream, the decomposition products (hydrogen and oxygen) are both released within the housing to mix with the air stream. However, when switch 198 is closed, the palladium envelope is heated, and hydrogen selectively diffuses through the envelope wall. Thus, the arrangement shown in FIG. 10 separates hydrogen from the fluid stream by diffusion even though both decomposition products are released to mix with it.

The importance of the invention can be appreciated from considering its application to the dehumidification of air. The removal of each part per million of water from $10^6$ cubic feet of air requires about .2 kw.-hr. which, at a typical industrial rate of 9 mills per kw.-hr., amounts to only $1.80 per million cubic feet of initially 1000 p.p.m. gas dried to less than 10 p.p.m. Further economic advantages brought about by the continuous, non-contaminating features of this invention are the elimination of cycling, regeneration, and recycling equipment from the initial investment, and by the attendant reduction in operating and maintenance costs from the elimination of the recycling and regeneration labor.

Moreover, for some dehumidification applications, the complete removal of water is not only unnecessary but undesirable. For example, an optimum relative humidity for human comfort is generally considered to be between 40% and 60% at 75° F. Therefore, the efficiency of commercial units employing this invention for the home, office, etc., does not have to be high. In addition, if the dehumidification apparatus of this invention is used in conjunction with a gas-heated, gas absorption refrigeration system, operating costs are further reduced by collecting and burning the hydrogen to reduce the natural gas supply needed to run the refrigeration system. For example, the variability in natural gas supply needed (as humidity of processed air increases or decreases) is controlled by a bimetallic controlled valve operative in response to the flame temperature of the gas pilot of the refrigeration system, decreasing the ratio of natural gas to hydrogen as flame temperature of the gas pilot rises due to increasing hydrogen concentrations, and increasing the ratio of gas to hydrogen as humidity decreases.

I claim:

1. The method for removing moisture from a fluid substance by electrolytic decomposition and for recovering one of the products of decomposition independently of the fluid substance and of the other product of decomposition, which method includes the simultaneous performance of the following steps:
    (a) exposing the moist substance to one side of a selected portion of a body of a sorption medium which has the characteristic of sorbing moisture from the substance and becoming electrically conductive in response thereto so that the moisture is sorbed from the substance into the medium,
    (b) contacting said selected portion of the body of medium with a pair of electrodes at spaced locations,
    (c) applying to the electrodes a voltage sufficient to effect electrolytic decomposition of moisture sorbed by said portion of the medium to release decomposition products of the moisture from the medium,
    (d) extracting the decomposition products from said portion, and
    (e) passing one of the decomposition products through a barrier permeable to said one product but impermeable to moisture, the substance and the other decomposition product to separate said one product from the moisture, the substance and the other decomposition product.

2. The method for removing from a moist fluid substance an electrolytic decomposition product of water which method includes the simultaneous performance of the following steps:
    (a) exposing the moist substance to one side of a selected portion of a body of a sorption medium which has the characteristic or sorbing moisture from the substance and becoming electrically conductive in responsive thereto so that moisture is sorbed from the substance into the medium,
    (b) contacting said selected portion of the body of medium with a pair of electrodes at spaced locations so that one of the electrodes contacts the one side of the body,
    (c) applying to the electrodes a voltage sufficient to effect electrolytic decomposition of moisture sorbed by said portion of the medium to release decomposition products of the moisture from the medium at the electrodes,
    (d) disposing adjacent the one side of the body a barrier which is permeable to the one decomposition product which is released from the medium at the electrode in contact with said one side of the body but which is impermeable to moisture, the substance and the other product, and
    (e) passing the one decomposition product through the barrier.

3. The method according to claim 2 including the simultaneous heating of the barrier.

4. The method for electrolytically removing water from a moist fluid substance and for recovering one of the products of electrolytic decomposition of the water independently of the fluid substance, which method includes the simultaneous performance of the following steps:
    (a) exposing the moist substance to one side of a selected portion of a body of a sorption medium which has the characteristic of sorbing water from the substance and becoming electrically conductive in response thereto so that the water is sorbed from the substance into the medium,
    (b) contacting the one side and an opposite side of said selected portion of the body of medium with a pair of electrodes,
    (c) isolating the sides of the body from each other,
    (d) applying to the electrodes a voltage sufficient to effect electrolytic decomposition of water sorbed by said portion of the medium to release decomposition products of water from the medium at the electrodes,
    (e) disposing adjacent the one side of the body a barrier which is permeable to the one decomposition product released from the medium at the electrode in contact with the one side of the body but which is impermeable to moisture and the substance, and
    (f) passing the one decomposition product through the barrier to recover said one decomposition product free of the fluid substance.

5. The method for electrolytically removing water from a moist fluid substance and for collecting the electrolytic decomposition products of water, which method includes the simultaneous performance of the following steps:
    (a) exposing moist substance to one side of a selected portion of a body of a sorption medium which has the characteristic of sorbing the water from the substance and becoming electrically conductive in response thereto so that the water is sorbed from the substance into the medium,
    (b) isolating the one side and an opposite side of the body from each other,
    (c) contacting the one side and an opposite side of said selected portion of the body of medium with a pair of electrodes,
    (d) applying to the electrodes a voltage sufficient to effect electrolytic decomposition of water sorbed by said portion of the medium to release decomposition products of the water from the medium at the electrodes,
    (e) extracting the decomposition products from said portion,
    (f) passing the one decomposition product released at the electrode in contact with the one side of the body through a barrier permeable to said one product but impermeable to water to collect said one product free of the moisture in the substance, and
    (g) collecting the other decomposition product adjacent the opposite side of the body.

6. The method for removing water from a fluid substance and for obtaining in pure form the electrolytic decomposition products of water, which method includes the simultaneous performance of the following steps:
    (a) exposing a mixture of the substance and water to one side of a selected portion of a body of a sorption medium which has the characteristic of sorbing the water from the substance and becoming electrically conductive in response thereto so that the water is sorbed from the substance into the medium,
    (b) contacting the one side and an opposite side of said selected portion of the body of medium with a pair of electrodes, said sides being isolated from each other,
    (c) applying to the electrodes a voltage sufficient to effect electrolytic decomposition of water sorbed by said portion of the medium to release hydrogen and oxygen as decomposition products from the medium at the electrodes, one of the decomposition products being released into the substance, (d) passing said one decomposition product through a barrier disposed in said substance and permeable to said one product but impermeable to water, to the other product and to the substance, and (e) collecting the other decomposition product adjacent the other electrode.

References Cited by the Examiner

UNITED STATES PATENTS

| | | | |
|---|---|---|---|
| 813,105 | 2/06 | McCarty | 240—129 |
| 1,828,872 | 10/31 | Marsh | 204—266 |
| 2,228,264 | 1/41 | Freedley | 204—266 |
| 2,390,591 | 12/45 | James | 204—129 |
| 2,683,116 | 7/54 | Zdansky | 204—129 |
| 2,816,067 | 12/57 | Keidel | 204—129 |
| 2,882,212 | 4/59 | Beard | 204—195 |
| 2,900,317 | 8/59 | Keidel | 204—195 |
| 2,927,888 | 3/60 | Beard | 204—195 |
| 3,038,853 | 6/62 | Cole | 204—129 |
| 3,050,371 | 8/62 | Dawson et al. | 204—195 |
| 3,062,732 | 11/62 | Keidel | 204—129 |

JOHN H. MACK, *Primary Examiner.*

JOHN R. SPECK, MURRAY TILLMAN, *Examiners.*